A. S. COLTHARP.
MACHINE FOR REMOVING BOLL WEEVIL.
APPLICATION FILED OCT. 6, 1914.

1,149,500.

Patented Aug. 10, 1915.
2 SHEETS—SHEET 1.

Witnesses

Albert S. Coltharp Inventor by C A Snow & Co.
Attorneys

A. S. COLTHARP.
MACHINE FOR REMOVING BOLL WEEVIL.
APPLICATION FILED OCT. 6, 1914.

1,149,500.

Patented Aug. 10, 1915.
2 SHEETS—SHEET 2.

Witnesses

Albert S. Coltharp Inventor by C. A. Snow & Co.
Attorneys

UNITED STATES PATENT OFFICE.

ALBERT S. COLTHARP, OF TALLULAH, LOUISIANA.

MACHINE FOR REMOVING BOLL-WEEVIL.

1,149,500.  Specification of Letters Patent.  Patented Aug. 10, 1915.

Application filed October 6, 1914. Serial No. 865,337.

*To all whom it may concern:*

Be it known that I, ALBERT S. COLTHARP, a citizen of the United States, residing at Tallulah, in the parish of Madison and State of Louisiana, have invented a new and useful Machine for Removing Boll-Weevils, of which the following is a specification.

This invention relates to machines for removing boll weevils and punctured squares from cotton plants, although the same is also equally useful in removing insects from other plants growing in rows.

One of the objects of the invention is to provide a light but durable machine which can be readily drawn along a row, said machine carrying pans designed to hold oil or some other form of insecticide, there being means for agitating the plant during the passage of the pans at the sides thereof, whereby the insects adhering to the plants will be dislodged and any perforated squares on the plants will also be shaken off of the limbs.

A further object is to provide novel means for suspending the pans within the machine, said pans being adjustable upwardly and downwardly and being adapted to shift toward or from each other in order to accommodate themselves to plants of different sizes.

A further object is to provide means for holding the plants out of the fluid contained within the pans.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

Figure 1:
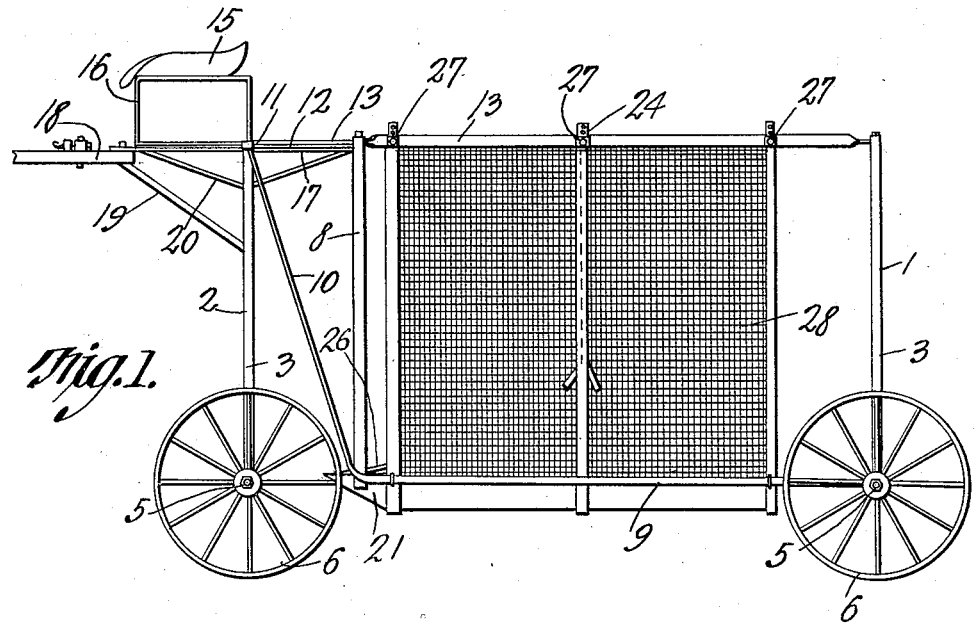
Figure 2:
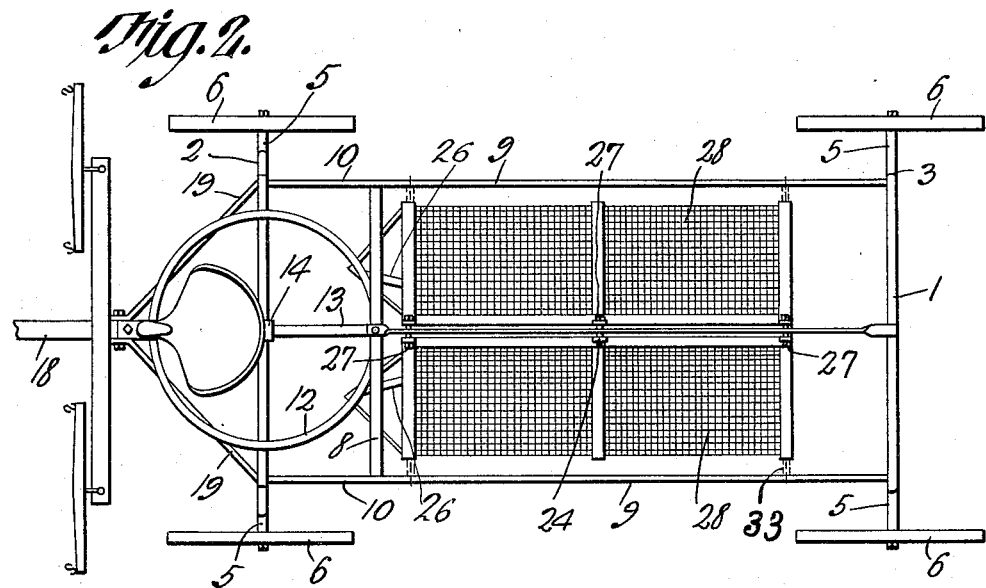
Figure 3:
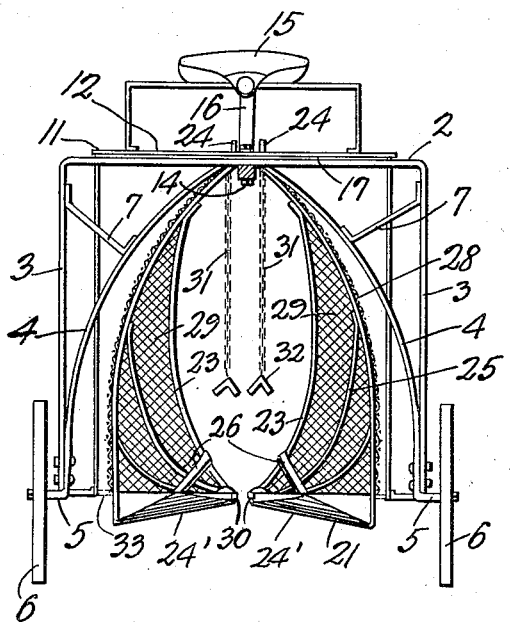
Figure 4:
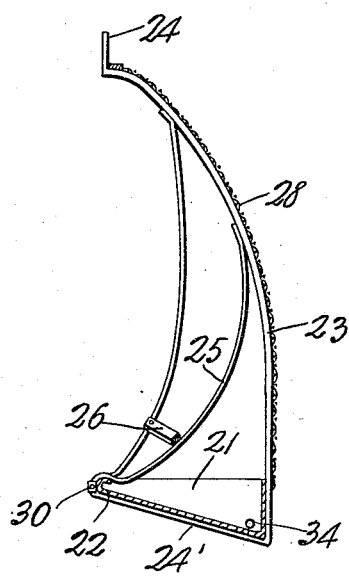
Figure 5:
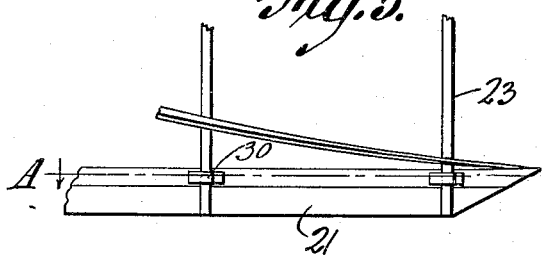
Figure 7:
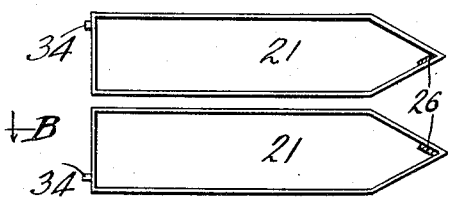
Figure 6:
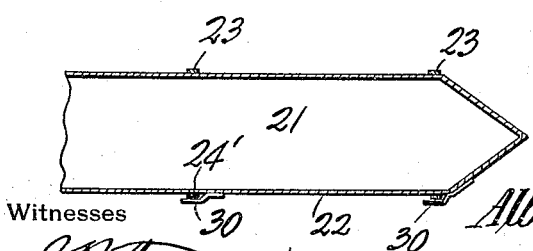

In said drawings:—Figure 1 is a side elevation of the machine. Fig. 2 is a plan view thereof. Fig. 3 is a front elevation. Fig. 4 is an enlarged vertical transverse section through one of the pans and its guard. Fig. 5 is an inner side elevation of one of the pans. Fig. 6 is a plan view of a portion of one of the pans. Fig. 7 is a horizontal section, on a reduced scale, through both of the pans, said section being taken approximately on the line A—B of Fig. 5.

Referring to the figures by characters of reference 1 and 2 designate frame members each of which is formed preferably of a top strip 2 having parallel depending sides 3 secured at their lower ends to the outer sides of opposed downwardly diverging curved members 4, these curved members being integral and being secured to the middle portion of the top strip 2 as shown. Spindles 5 may be extended outwardly at the lower ends of the curved member 4 for engagement by supporting wheels 6. The frame member 2 located at the front end portion of the machine where the said machine is subjected to the greatest weight, can be provided with suitable braces 7 as shown in Fig. 3.

A frame member 8 is located between the members 1 and 2 and is similar in construction thereto, with the exception that it is not provided with laterally extending spindles. Instead the lower end portions of this frame member 8 are secured to side strips 9 the rear ends of which are fastened to the rear frame member 1. The cross ends of the side strips 9 are formed with forwardly and upwardly inclined portions 10 secured at their upper ends to arms 11 extending in opposite directions from a ring 12. This ring 12 is secured to the front end portion of a reach strip 13 fastened to the frame members 2, 8 and 1 at the centers of the tops thereof, the frame members 1 and 8 being fixedly attached to the reach 13 while the frame member 2 is connected to said reach strip by means of a king bolt 14. A seat 15 may be mounted upon the ring 12, a suitable supporting bracket being provided therefor.

Ring 12 bears downwardly upon another ring 17 which is fixedly mounted upon the frame member 2 and a drop beam 18 may be extended under and fixedly secured to said ring, said beam being provided with braces 19 which are secured to the sides of the frame member 2. Additional braces 20 connect the front and rear portions of the ring 17 to the sides of the frame member 2.

The means employed for collecting and destroying boll weevils and the like consists of two opposed pendant guards and collectors. Each consists of a pan 21 having its bottom inclined upwardly toward the inner side thereof and provided at each side and adjacent each end with a retaining wall or flange, the inner side flange or wall 22 being inturned as shown particularly in Fig. 4. Each pan is supported by a series of hangers made up of an arcuate strap 23 provided at its upper end with an upwardly extending tongue 24 and at its lower end with an upwardly and inwardly inclined arm 25. The pan 21 is adapted to rest on the arms of the several straps and within the angles formed by said arms and the straps as shown in Fig. 4. The inclined arms 24' lap the inner flange 22 of the pan and merge into arcuate braces 25. These braces are of different lengths. The braces 25 of the rear straps 23 are connected to the upper portions of the straps while the braces of the straps 23 are connected to said straps near their lower ends. Intermediate straps have their braces connected to intermediate portions of the straps. This arrangement has been clearly illustrated in Fig. 3. A lifting strip 26 is secured upon the brace 25 above each pan and to the front of each pan and is inclined upwardly and rearwardly. Each of these strips serves as a support for the limbs of the plant so as to prevent said limbs from dragging into the pan under the strip. The braces 25 constitute the means for engaging the branches of the plant and agitating them.

The tongues 24 extend to opposite sides of the reach strip 13 and are connected thereto by transverse bolts 27 or the like, each tongue being preferably formed with a vertical series of apertures so that the pans can be adjusted upwardly and downwardly relative to the wheel supported structure.

The hangers or straps 23 of each pan form a frame on which is mounted a curved fabric guard or shield 28 preferably formed of wire and which shield extends from the pan 21 up to the tongues 24. The space between this arcuate shield 28 and the rear brace 25 is also preferably closed by means of a strip 29 of wire fabric.

In order to prevent the arms 24' from barking the plant where said arms extend around the flange 22 of the pan, deflecting fingers 30 are preferably secured to the inner sides of the pan and extend past the arms 24 so that should a plant be engaged by the inner side of a pan, it will be deflected by the fingers 30 without coming into engagement with the upwardly and inwardly turned portion of the arms 24'.

Each of the pans 21 is preferably formed with a pointed front end and the front portion of the bottom of each pan is inclined upwardly to the point.

For the purpose of increasing the agitation of the plants acted on by the machine, chains or other flexible devices indicated at 31 are suspended from the intermediate strips 23 and carry considerable weights 32 for hitting against and dragging over the plants.

In using the machine herein described oil or any other suitable insecticide is placed in the pans 21, said pans being prevented from swinging together by fastening them to the side strips 9 by means of chains 33 or the like. The machine is then placed astride the row to be acted on and, when drawn forward, will pass along opposite sides of the row, the plant being received between the diverging front end portions of the pan. As the machine passes over a plant the limbs strike against the braces 25 and ride over the strips 26 while at the same time the weights 32 drag over the plants. Thus said plants will be thoroughly agitated and not only will boll weevils and other insects be dislodged therefrom, but perforated squares will also be dislodged and will fall, with the insects, into the pan 21 while the oil will act as an insecticide and destroy both the insects and any larvæ contained within the punctured squares.

The insecticide can be drained from the pan by removing plugs 34 from drain openings in the bottoms thereof and, should it be desired to remove the pan, it is merely necessary to unfasten the tongues 24 from the reach strips 13 whereupon they can be readily lowered and lifted out of the machine.

As before pointed out the pans can be adjusted upwardly and downwardly relative to the main structure of the machine simply by placing the supporting bolts 27 in different openings in the tongues 24.

Although the machine has been shown provided with front steering wheels, it is to be understood that the member 2 can be dispensed with if desired and the wheels can be applied to the member 8, this last structure being especially designed for use on small plants where a very light machine can be used, the same being pulled by hand and being tilted on end when it is desired to turn it upon reaching the end of a row. Furthermore, if preferred, the single pair of supporting wheels can be used instead of two pairs, the single pair being mounted adjacent the center of the machine so that said machine can be operated in the same manner as a cart. In all these forms of machine the pans and the guards are mounted in the same manner as hereinbefore described.

What is claimed is:—

1. A machine for gathering boll weevils, including wheel supported frame members, a connection therebetween, opposed series of hangers adjustably and pivotally connected to said connection, opposed parallel pans supported by the hangers, and a foraminous shield extending upwardly and inwardly from the outer side of each pan, arcuate braces overhanging each pan and extending to different elevations, said braces constituting plant agitating means.

2. The combination with a wheel supported structure including lower side strips and upper connecting strips, of hangers adjustably and pivotally connected to said connecting strips and having inwardly extending arms at their lower ends, pans supported by said arms, said pans being oppositely disposed and forming a continuous plant receiving space therebetween, flexible connections between the pans and the lower connecting strips for limiting the movement of the pans toward each other, and foraminous shields supported by the hangers overhanging the pans, said shields extending from the outer sides of the pans.

3. The combination with a wheel supported structure including lower side strips and upper connecting strips, of hangers adjustably and pivotally connected to said connecting strips and having inwardly extending arms at their lower ends, pans supported by said arms, said pans being oppositely disposed and forming a continuous plant receiving space therebetween, flexible connections between the pans and the lower connecting strips for limiting the movement of the pans toward each other, the inwardly extending arms being extended upwardly past the inner sides of the pan, braces extending from said arms and over-hanging the pans, said braces constituting agitating means, and plant deflectors secured to the inner sides of the pans and extending past the upwardly extending portions of the arms.

4. The combination with a wheel supported structure including arched members, a reach strip constituting connections between the tops of the members, and lower side strips connecting the members, of opposed series of hangers adjustably, pivotally and detachably connected to the reach strip, arms extending inwardly from the lower ends of the hangers, pans supported by the arms, flexible connections between said hangers and the lower side strips for holding the pans spaced apart thereby to form a continuous plant receiving opening between the pans, braces connecting the arms to the hangers and overhanging the pans, said braces being disposed out of line and constituting plant agitating means.

5. The combination with a wheel supported structure including arched members, a reach strip constituting connections between the tops of the members, and lower side strips connecting the member, of opposed series of hangers adjustably, pivotally and detachably connected to the reach strip, arms extending inwardly from the lower ends of the hangers, pans supported by the arms, flexible connections between said hangers and the lower side strips for holding the pans spaced apart thereby to form a continuous plant receiving opening between the pans, braces connecting the arms to the hangers and overhanging the pans, said braces being disposed out of line and constituting plant agitating means, and means supported by the braces for lifting the limbs of the plants to hold them out of the pan.

6. The combination with a wheel supported structure including arched members, a reach strip constituting connections between the tops of the members, and lower side strips connecting the members, of opposed series of hangers adjustably, pivotally and detachably connected to the reach strip, arms extending inwardly from the lower ends of the hangers, pans supported by the arms, flexible connections between said hangers and the lower side strips for holding the pans spaced apart thereby to form a continuous plant receiving opening between the pans, braces connecting the arms to the hangers and overhanging the pans, said braces being disposed out of line and constituting plant agitating means, said pans having a drain opening, and means for closing the opening.

7. A machine for gathering boll weevils, including movably supported frame members, a connection therebetween, opposed series of hangers adjustably and pivotally attached to said connection, opposed parallel pans supported by the hangers, a foraminous shield extending upwardly and inwardly from the outer side of each pan, thereby to overhang the pan, and plant agitating means overhanging each pan and extending to different elevations.

In testimony that I claim the foregoing as my own, I have hereto affixed my signature in the presence of two witnesses.

ALBERT S. COLTHARP.

Witnesses:
W. S. CRAIG,
E. A. BEERS.